(No Model.)  5 Sheets—Sheet 1.

C. S. LEWIS.
CASH REGISTER AND INDICATOR.

No. 478,164.  Patented July 5, 1892.

(No Model.) 5 Sheets—Sheet 2.
C. S. LEWIS.
CASH REGISTER AND INDICATOR.

No. 478,164. Patented July 5, 1892.

Witnesses:
Jas. E. Hutchinson
R. A. Ferguson

Inventor
Charles S. Lewis
By H. A. Seymour
Atty.

(No Model.) 5 Sheets—Sheet 3.
C. S. LEWIS.
CASH REGISTER AND INDICATOR.

No. 478,164. Patented July 5, 1892.

Witnesses:
Jas. E. Hutchinson
R. S. Ferguson

Inventor:
Charles S. Lewis
By H. A. Sumpson
Atty.

(No Model.) 5 Sheets—Sheet 4.
C. S. LEWIS.
CASH REGISTER AND INDICATOR.
No. 478,164. Patented July 5, 1892.
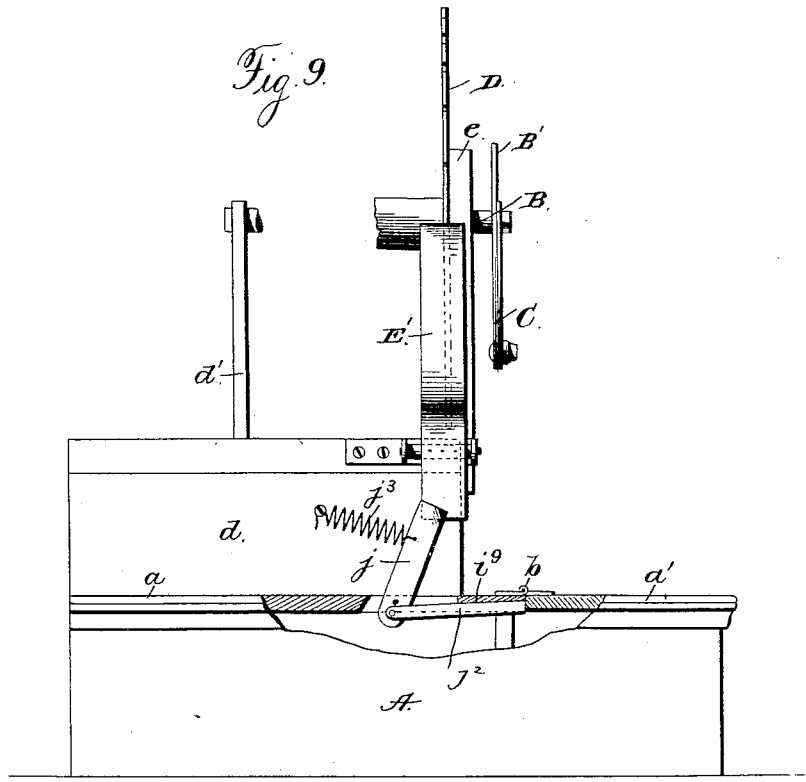
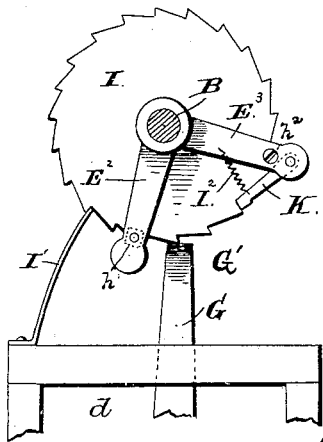
Witnesses:
Jas. E. Hutchinson.
V. E. Hodge.
Inventor.
Charles S. Lewis,
By H. A. Seymour
Atty

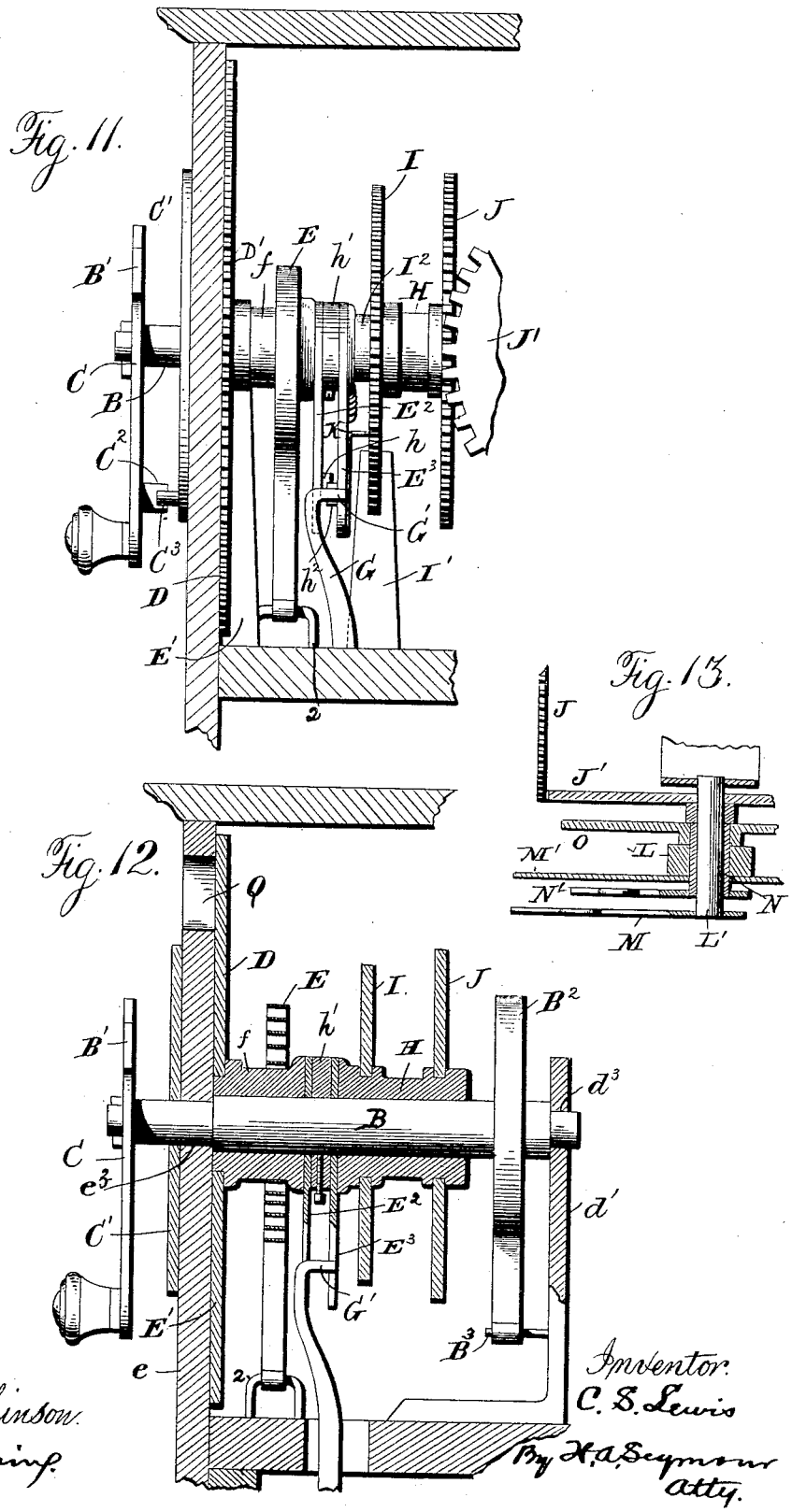

UNITED STATES PATENT OFFICE.

CHARLES S. LEWIS, OF WATERBURY, CONNECTICUT.

CASH REGISTER AND INDICATOR.

SPECIFICATION forming part of Letters Patent No. 478,164, dated July 5, 1892.

Application filed January 31, 1890. Serial No. 338,722. (No model.)

*To all whom it may concern:*

Be it known that I, CHARLES S. LEWIS, a resident of Waterbury, in the county of New Haven and State of Connecticut, have invented certain new and useful Improvements in Cash Indicators and Registers; and I do hereby declare the following to be a full, clear, and exact description of the invention, such as will enable others skilled in the art to which it appertains to make and use the same.

My invention relates to an improvement in cash indicators and registers, and has for its object to produce a machine of this class which will be cheap to manufacture and by means of which an accurate register of sales can be kept.

A further object is to so construct a cash-indicator that the amount of sales may be exhibited to the purchaser and at the same time a register made of such amount for the conveniences of the salesman.

A further object is to so construct and arrange the device that the amount of the sales made will be indicated and registered at one and the same operation and by the use of a single operating-lever.

A further object is to provide a registering device by means of which the sales may be registered accurately, the amount of one sale being added to the aggregate amount of previous sales.

With these objects in view my invention consists in certain novel features of construction and combinations and arrangements of parts, as hereinafter set forth, and pointed out in the claims.

Figure 1:
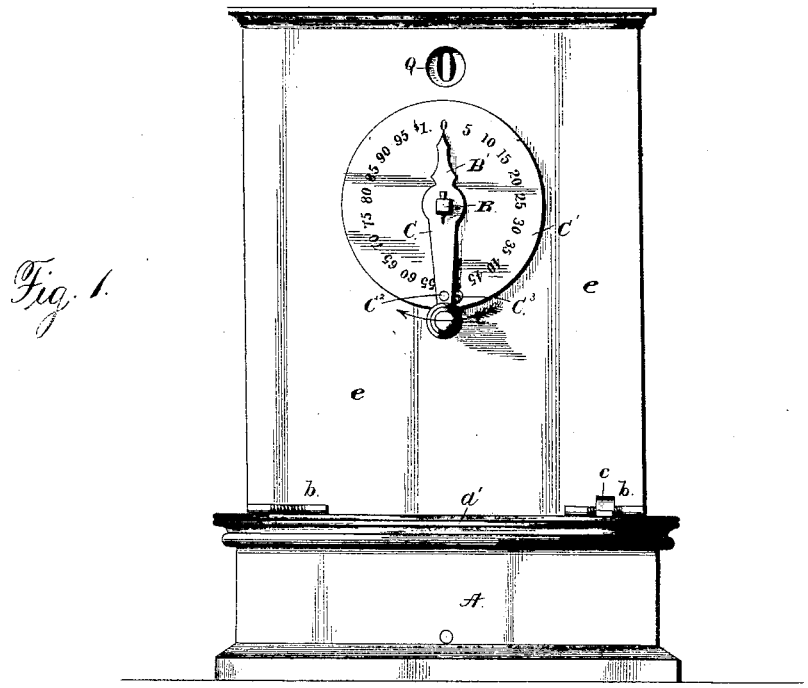
Figure 2:
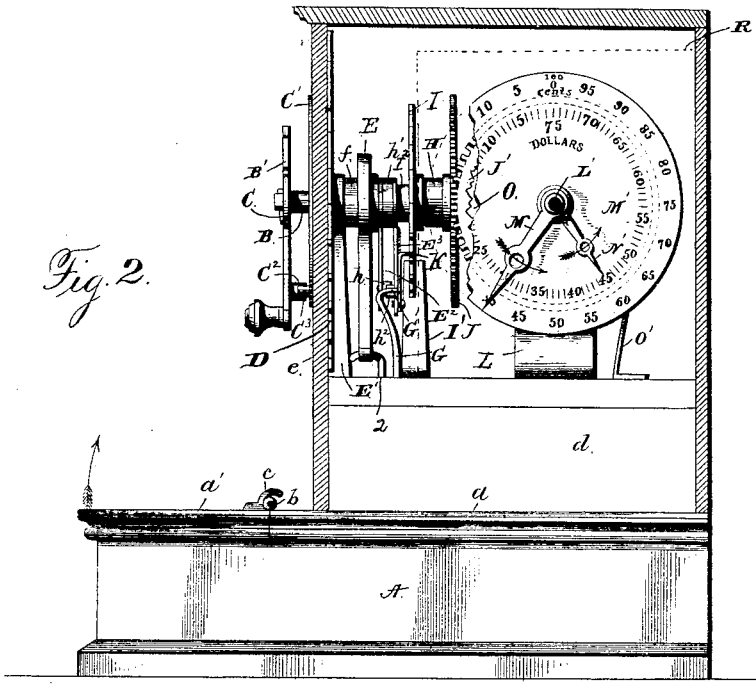
Figure 3:
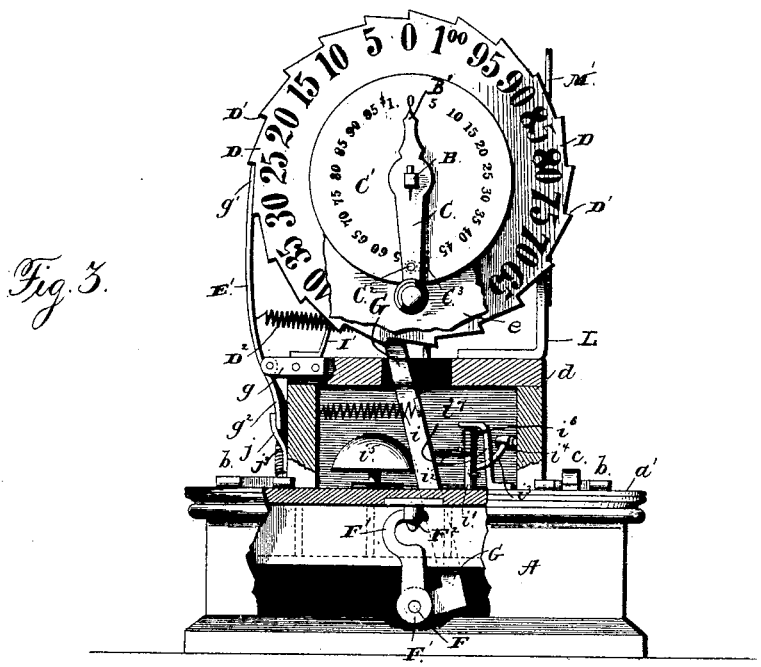
Figure 4:
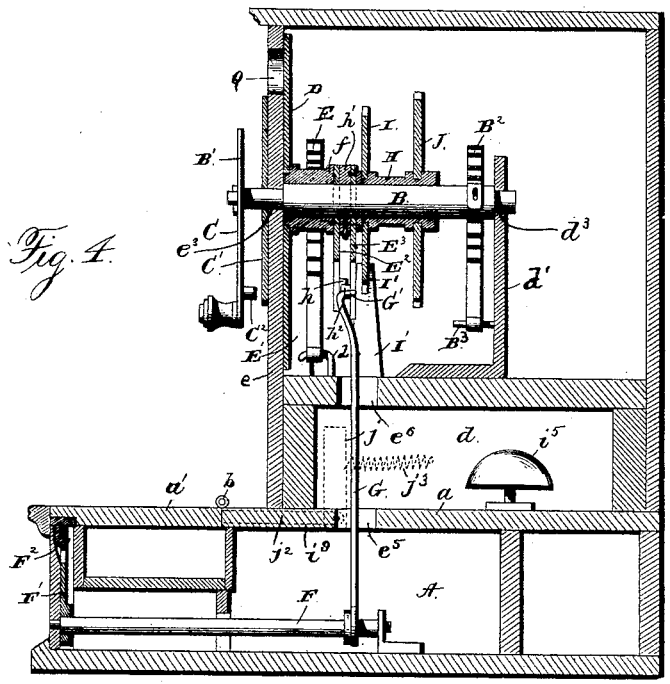
Figure 5:
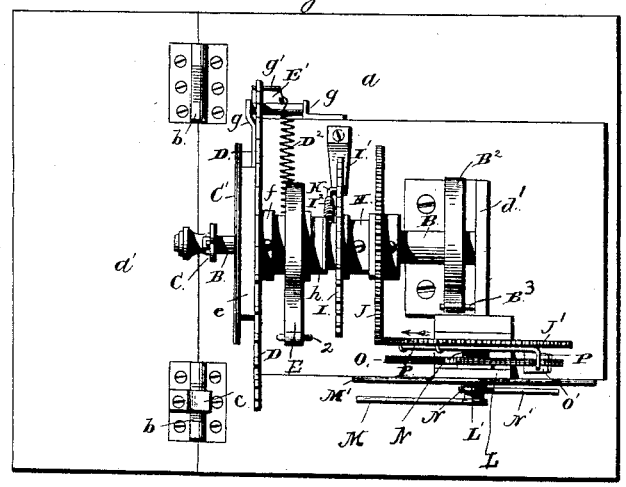
Figure 6:
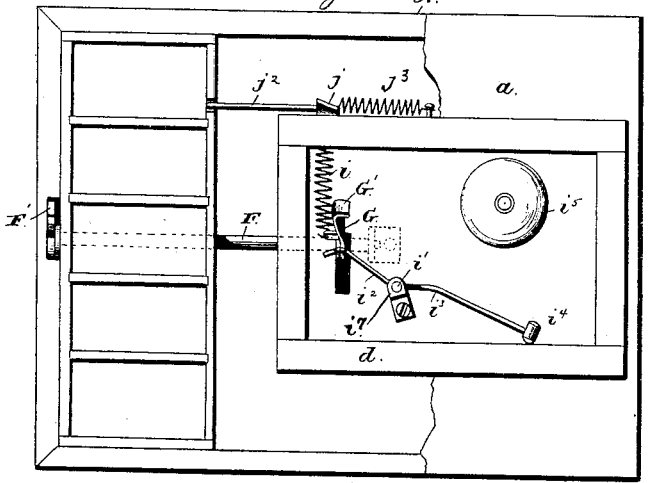
Figure 7:
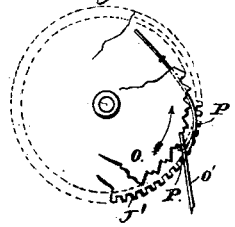
Figure 8:
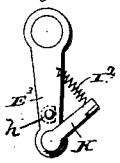

In the accompanying drawings, Figure 1 is a front view of the device. Fig. 2 is a side view with the casing partly broken away to show parts of the mechanism. Fig. 3 is a front view with the casing removed and parts broken away. Fig. 4 is a longitudinal sectional view. Fig. 5 is a plan view. Fig. 6 is an interior plan view of the box $d$. Fig. 7 is a detail view showing wheels J' and O. Fig. 8 is a detail showing arm $E^3$ and dog K. Fig. 9 is a left-side elevation of a portion of the indicator. Fig. 10 is a detail view. Fig. 11 is a side view of the indicating mechanism. Fig. 12 is a sectional view of the same. Fig. 13 is a horizontal sectional view of the registering mechanism.

A represents a cash-box having a cover made in two sections $a$ $a'$, section $a$ being secured to the body of the box and the section $a'$ hinged to the section $a$ by means of spring-hinges $b$, a stop $c$ being secured to one section and adapted to engage the other to limit the movement of the hinged section. The box will also be provided, interiorly, with ways for the support of the tray commonly employed in cash-boxes for the reception of change.

Fixed upon the rigid top $a$ of the cash-box is a box $d$, and located over this box $d$ is a cover or casing $e$. This cover or casing $e$ and a standard $d'$ have journal-bearings for the reception of the respective journals of a shaft B, said shaft protruding some distance through the cover or casing $e$ for the reception of an operating-lever C, which is rigidly secured thereto. This lever C is provided with a projection $C^2$ to engage a stop $C^3$ on a disk C' to limit its movement. This operating-lever is extended beyond its connection with the shaft B to produce a pointer B', or, if desired, the pointer may be made separately and secured to the operating-lever.

The disk or dial C' is secured on the front face of the cover or casing $e$ and provided with figures representing different denominations of money, preferably counted by fives from "0" to "$1," with which figures the pointer B' is adapted to register, as hereinafter explained. The pointer B' is maintained normally at the starting-point by means of a spring $B^2$, one end of which is secured to the shaft B and the other end to the pin $B^3$, projecting from the standard $d'$, as shown in Fig. 12.

Loosely mounted upon the shaft B near its forward end is a sleeve $f$, Figs. 11 and 12, to which is secured a disk D, having ratchet-teeth D' on its periphery. The disk is located just inside the casing $e$, and its front face is provided with figures representing fractional parts of one dollar, preferably counting by fives, each number being placed coincident with one of the ratchet-teeth D', consequently the disk D must contain twenty-one teeth, including the tooth representing "0" or "starting-point."

The spring E is coiled about the sleeve $f$, and has one end secured thereto, its opposite end being secured to a pin or post 2, secured to the top of the box $d$, as shown in Figs. 11 and 12, this spring tending at all times to cause the disk D to turn in one direction.

To prevent the disk D from being rotated by the spring E at an improper time a dog E′, Figs. 3 and 12, is pivoted to the box $d$ and adapted to engage the teeth D′ of said disk, being normally held in contact with the disk by means of a spring D², Fig. 3. The dog E′ is preferably composed of a comparatively long plate of suitable material, pivoted at a point between its ends in brackets $g$, secured to the box $d$, the upper end $g'$ being adapted to engage the teeth of the disk, as above explained, and the lower end $g^2$ being adapted to be engaged by a device hereinafter explained, whereby the dog is released from engagement with the teeth of disk D and said wheel or disk allowed to return to the starting-point.

Secured to the inner end of the loosely-mounted sleeve $f$ is an arm E², which, when the disk D is in its normal position, projects downwardly and is provided at or near its free end with a projection or screw $h$.

Secured upon the shaft B at a point slightly removed from the arm E² is a collar $h'$, and secured to this collar is a depending arm E³, having a projection $h$ therefrom adapted to engage the stud $h$ of the arm E², as shown in Figs. 10 and 11.

Mounted in the bottom of the cash-box A is a shaft F, provided at its forward end with a hook F′, which projects upwardly from said shaft and is adapted to engage a catch F² on the hinged lid $a'$. The rear end of the shaft F, Fig. 4, is provided with a rigidly-fixed arm G, which projects upwardly from said shaft through perforations $e^5$ $e^6$ in the cash-box A, and box $d$ terminating at its upper end in a short arm G′, which is located in proximity to the projections $h$ $h^2$ of the arms E² E³, Figs. 2, 4, 10, and 11. A spring $i$, Fig. 6, is secured at one end of the arm G, and at the other end to one side wall of the box $d$, this spring tending to rock the shaft F in a direction to cause the hook F′ to be disengaged from the catch F². The relative strength of the springs E $i$ is such that when the pressure of the arm E² is brought to bear against the short arm G′ of arm G the force of the spring $i$ will be overcome and the shaft F rocked to cause the hook F′ to engage the catch F². A post $i'$ is mounted in the box $d$, Fig. 6, and provided with two oppositely-projecting arms $i^2$ $i^3$, the arm $i^2$ being adapted to be engaged by the upright arm G, and the arm $i^3$ provided with a hammer $i^4$, adapted to strike a bell $i^5$, located on box $d$. The hammer is held normally away from the bell by means of a spring $i^8$, Fig. 4, coiled around the post $i'$ and secured at its respective ends to the arm $i^2$ and the upright $i^7$, which supports the post $i'$.

A lever $j$, most clearly shown in Fig. 9, is pivoted to one side of the box $d$, its lower end being projected through a slot in the section $a$ of the cash-box lid, where it is pivotally connected to a rod $j^2$, which extends in a horizontal direction through a recess $i^9$, made in said section $a$, and terminating at its free end in position to be engaged by the inner edge of the hinged lid $a'$ when the latter is closed, a spring $j^3$ being secured at one end to the lever $j$ and at the other end to the box $d$ to hold said lever normally out of contact with the end $g^2$ of the dog E′ when the lid $a'$ is elevated.

Thus far I have described the device whereby the cash-box is automatically opened and the amount of a sale indicated or made to appear to the purchaser by the operation of a single lever, and will now proceed to describe the construction of mechanism used in conjunction with the above-described devices for keeping a register of the aggregate amount of sales made. A loose collar H is mounted on the shaft B, and has secured thereto a ratchet-wheel I and a gear-wheel J, as shown in Figs. 2, 4, 5, 11, and 12. A spring-dog I′ is secured at one end of the box $d$ and bears at its free end against the peripheral teeth of the ratchet-wheel I, thus preventing the backward rotation of said ratchet-wheel. A dog K, Fig. 10, is pivoted at one end to the free end of arm E³, and at the other end adapted to engage the teeth of the ratchet-wheel I, being held in engagement with said wheel by means of a spring I². A standard L, Figs. 3, 5, and 13, is located upon the box $d$ at right angles to standard $d'$ and has journaled at or near its upper end a short shaft L′, to which latter is secured a gear-wheel J′, adapted to mesh with and rotate at right angles to the gear-wheel J. To one end of the shaft L′ a hand or pointer M, Figs. 2 and 13, is secured and adapted to register with numbers indicating different denominations of money on the face of a dial or disk M′, secured to the upright L. The numbers with which the hand M registers denote fractional parts of a dollar, counting from "0" by fives to one dollar. Thus when the indicator is operated as above described, the amount indicated in cents on the dial or disk C′ will also be registered on the dial M′ through the medium of the mechanism last above described. The dial M′ is also provided with a second set of marks, each of which represents one dollar, and the aggregate of these marks represents seventy-five dollars. A sleeve N is loosely mounted on the shaft L′ and has secured to one end a pointer or hand N′, adapted to point out the figures on the dial M′ representing dollars. Also secured to the sleeve N is a ratchet-wheel O, having its teeth notched as shown in Fig. 7. The dog O′ is secured to the top of the box $d$, Fig. 2, and bears at its free end against the toothed periphery of the wheel O, thus preventing said wheel from retrograde movement, and also serving a further purpose, which will presently be explained.

A spring-dog P, Fig. 7, is secured at one end to the gear-wheel J′ and adapted to be maintained normally in proximity to the ratchet-wheel O. The dog P is so arranged on the wheel J' relatively to the ratchet-wheel O that when the hand or pointer M shall have made one revolution, thus registering one dollar, the dog P will engage the under face of the spring-dog O' and be forced thereby in engagement with one of the notched teeth of the ratchet-wheel O, and rotate the same one notch. When the dog P reaches the dog O', as shown in Fig. 7, it will of course travel to the end of the latter and then from the teeth of wheel O, and this wheel, being now disengaged, will turn freely with the shaft upon which it is mounted until dog P passes dog O', when the latter again locks the ratchet-wheel by its engagement therewith, and dog P springs out of the way, the distance of such rotation while the wheel is released being the distance between two dollar-marks on the dial M. The ratchet-wheel having thus been made to rotate one notch the hand N' will be made to move one point and indicate one dollar. It will be seen that the indicating-pointer B' cannot make a complete revolution. Consequently while the gear-wheel J on the main shaft will contain, say, eighty-four teeth, the gear-wheel J' will contain but eighty.

I have represented the dial M' as capable of indicating an aggregate of seventy-five dollars, but it is evident that by a multiplicity of parts any amount may be registered.

The mechanism, with the exception of the pointer B' and disk C', will be inclosed by means of suitable casing, as shown in Fig. 1, an opening Q being made in the face of the casing, through which one number at a time on the disk D may be seen, and a door R will be provided by means of which access may be had to the registering-dial.

The operation of the machine is as follows: Assuming that the cash-box is closed, the parts in their normal positions, and it is desired to put, say, for example, twenty-five cents in the box, the knob of the lever C will be grasped and turned until the pointer B' is made to register with the number "25" on the disk C'. As the shaft B is thus rotated the arm $E^3$ will be made to move away from the arm G, thus releasing said arm G and permitting the shaft F to turn to withdraw the hook F' from the catch $F^2$, whereupon the lid $a'$ will be raised by means of its spring-hinges. The projection $h^2$ on the arm $E^3$ will engage the projection $h$ on the arm $E^2$ and carry said arm $E^2$ with it, thus rotating the disk D until, for example, the number "25" is immediately over the shaft B. As soon as the hinged lid is raised, the pivoted lever $j$ will be drawn rearwardly out of engagement with the dog E' and said dog made to engage the teeth of the disk D and maintain said disk at the point to which it is rotated. When the pointer is made to register with the number "25" and the parts of the indicating device have operated, as above explained, the operating-lever will be released and permitted to fly back to the starting-point, at which operation the arm $E^3$ will return to its normal position and, striking the arm G, cause the hammer $i^4$ to strike the bell $i^5$ and thus sound the alarm. When the change has been made, the lid $a'$ will be closed, at which operation the lever $j$ will be forced into contact with the dog E and said dog moved out of contact with the disk D, thus permitting said disk to return to its normal position, at which time the arm $E^2$ will have returned to its normal position in engagement with the arm G and the shaft F rocked to cause the hook F' to engage the catch $F^2$ of the hinged lid. When the operating-lever C is manipulated to cause the movements of the parts above referred to, during the upward movement of the arm $E^3$ the dog K will ride over the teeth of the ratchet-wheel I and engage one of the teeth of said ratchet-wheel corresponding to the distance which said arm $E^3$ moves. When the arm $E^3$ returns to its normal position, the dog K will engage a tooth of the ratchet-wheel I and cause a partial rotation of said wheel. The gear-wheel J, being carried by the same sleeve as the ratchet-wheel I, will therefore rotate with said ratchet-wheel and, meshing with the gear-wheel J', will rotate it, which motion will be transmitted through the shaft L' to the hand M of the register, and thus register the amount of the sale. When the hand or pointer M shall have made one revolution, thus registering one dollar, the dog P will engage the under face of the spring-dog O' and be forced thereby in engagement with one of the notched teeth of the ratchet-wheel O and rotate the same one notch. When the dog P reaches the dog O', it will of course travel to the end of the latter and then from the teeth of the wheel O, and this wheel now being engaged will turn freely with the shaft upon which it is mounted until the dog P passes dog O', when the latter again locks the ratchet-wheel by its engagement therewith and dog P springs out of the way, the distance of such rotation while the wheel is released being the distance between two dollar-marks on the dial M'. The ratchet-wheel having thus been made to rotate one notch, the hand N' will be made to move one point and indicate one dollar.

Having fully described my invention, what I claim as new, and desire to secure by Letters Patent, is—

1. In a cash-indicator, the combination of a stationary disk having numbers thereon denoting different denominations of money, a pointer adapted to be moved over the face of said disk, a revoluble disk having numbers corresponding with the numbers on the stationary disk and ratchet-teeth on the periphery of the revoluble disk, a dog to engage said teeth, a spring-actuated lever to make contact with said dog to maintain it normally out of contact with the revoluble disk when the lid of the cash-box is closed, and a rod connected to said lever and adapted to make contact with the lid of the cash-box, whereby the revoluble disk will be engaged by the dog when the lid is raised, substantially as set forth.

2. In a cash-indicator, the combination, with a hinged spring-actuated cover, of a stationary disk having numbers thereon denoting different denominations of money, a pointer adapted to be moved over the face of said disk, a revoluble disk having numbers thereon corresponding with the numbers on the stationary disk, means for maintaining the revoluble disk at any desired position, a catch on the lid of the cash-box, a shaft carrying a hook to engage said catch, an arm on the shaft, and means to engage said arm and automatically release the hook from the catch when the device is operated, substantially as set forth.

3. In a cash-indicator, the combination, with an upright carrying a disk having numbers thereon, of a shaft, an operating lever secured to said shaft and carrying a pointer to be moved over the face of said disk, a disk loosely mounted on the shaft and having numbers thereon corresponding with the numbers on the first-mentioned disk, an arm secured to rotate with the loosely-mounted disk and having a projection thereon, an arm secured to the shaft and having a projection adapted to engage the projection on the first-mentioned arm to rotate it, and means for causing the loosely-mounted disk to be automatically released, substantially as set forth.

4. In a cash-indicator, the combination, with an upright carrying a stationary disk having numbers thereon, of a shaft, an operating lever secured to said shaft and carrying a pointer to be moved over said disk, a disk loosely mounted on the shaft and having numbers thereon corresponding with the numbers on the first-mentioned disk, an arm secured to rotate with the loosely-mounted disk and having a projection thereon, an arm secured to the shaft and having a projection adapted to engage the projection on the first-mentioned arm to rotate it, a spring for rotating the loosely-mounted disk in one direction, and means for causing said loosely-mounted disk to be automatically released, substantially as set forth.

5. In a cash-indicator, the combination, with a cash-box and an alarm-bell, of a stationary disk having numbers thereon, a pointer adapted to be moved over the face of said disk, a revoluble disk having numbers thereon corresponding with the numbers on the stationary disk, an arm adapted to rotate with the revoluble disk, a shaft in the cash-box, an arm projecting therefrom adapted to be engaged by the arm which moves with the revoluble shaft, and an arm secured to the upwardly-extending arm carrying a hammer to strike the bell when the device is operated, substantially as set forth.

6. The combination, with a stationary disk having numbers thereon, a pointer adapted to be moved over the face of said disk, and a revoluble disk having numbers thereon corresponding with the numbers on the stationary disk, of a dial having two sets of numbers thereon, a short shaft carrying a pointer and gear-wheel, a sleeve carrying a ratchet-wheel and a pointer, a spring-dog carried by said gear-wheel and adapted to intermittingly engage the ratchet-wheel and move it one tooth at a time, a gear-wheel on the main shaft, and ratchet mechanism connecting the gear-wheels on the main shaft with the indicator-disk, substantially as set forth.

In testimony whereof I have signed this specification in the presence of two subscribing witnesses.

CHARLES S. LEWIS.

Witnesses:
   H. FAGAN,
   THOS. F. FAGAN.